(12) United States Patent
Fang et al.

(10) Patent No.: US 12,313,500 B2
(45) Date of Patent: May 27, 2025

(54) LEAKAGE QUICK-DETECTION DEVICE FOR DRAINAGE PIPES

(71) Applicant: South China Institute of Environmental Science, MEE (Ecological and Environmental Emergency Research Institute, MEE), Guangzhou (CN)

(72) Inventors: Huaiyang Fang, Guangzhou (CN); Weijie Li, Guangzhou (CN); Jiale Chen, Guangzhou (CN); Zhiwei Huang, Guangzhou (CN); Shu Lin, Guangzhou (CN); Fantang Zeng, Guangzhou (CN)

(73) Assignee: SOUTH CHINA INSTITUTE OF ENVIRONMENTAL SCIENCE, MEE (ECOLOGICAL AND ENVIRONMENTAL EMERGENCY, Guangzhou (CN)

( * ) Notice: Subject to any disclaimer, the term of this patent is extended or adjusted under 35 U.S.C. 154(b) by 272 days.

(21) Appl. No.: 18/181,318

(22) Filed: Mar. 9, 2023

(65) Prior Publication Data

US 2024/0210265 A1     Jun. 27, 2024

(30) Foreign Application Priority Data

Dec. 23, 2022   (CN) .......................... 202211661370.0

(51) Int. Cl.
*G01M 3/02*          (2006.01)
(52) U.S. Cl.
CPC ..................................... *G01M 3/02* (2013.01)
(58) Field of Classification Search
CPC .......... G01M 3/38; G01M 3/246; G01M 3/00; G01M 3/005; G01M 3/02; G01M 3/18; G01M 3/2807; G01M 3/2823; G01M 3/40; G01M 5/0025; G01M 5/0083; B64U 2101/30; F16L 55/48; G01N 2021/1793; G01N 2021/1795; G01N 2021/3513; G01N 2021/399; G01N 2021/9544; G01N 21/35;

(Continued)

(56) References Cited

U.S. PATENT DOCUMENTS

| 9,804,102 | B2 * | 10/2017 | Taferner ................ G01M 3/005 |
| 2018/0217023 | A1 * | 8/2018 | Hansen .................. G01M 3/18 |
| 2019/0003918 | A1 * | 1/2019 | Li ...................... G01N 21/3504 |

* cited by examiner

*Primary Examiner* — Kristina M Deherrera
*Assistant Examiner* — Gedeon M Kidanu
(74) *Attorney, Agent, or Firm* — MUNCY, GEISSLER, OLDS & LOWE, P.C.

(57) ABSTRACT

A leakage quick-detection device for drainage pipes comprises an operating rod assembly, a development module and a probe assembly. The development module comprises a receiving shell. A development board is fixedly connected into the receiving shell. A receiving and transmitting antenna is fixedly connected to the receiving shell and is electrically connected to the development board. The probe assembly comprises a composite platform. Four threaded through-holes are vertically and regularly formed in the composite platform. The change of water flow and water quality can be quickly reflected by ultrasonic data, conductivity data and flow data; compared with a traditional visual detection method, the detection dimensions are richer, the working time of personnel is shortened, more water flow information can be obtained, the labor intensity is reduced, and the troubleshooting accuracy is improved.

8 Claims, 5 Drawing Sheets

(58) Field of Classification Search
CPC ............. G01N 21/3504; G01N 21/954; G01N 33/0027; Y02A 20/00
See application file for complete search history.

LEAKAGE QUICK-DETECTION DEVICE FOR DRAINAGE PIPES

BACKGROUND OF THE INVENTION

1. Technical Field

The invention relates to the technical field of detection of drainage pipes, in particular to a leakage quick-detection device for drainage pipes.

2. Description of Related Art

With the constant improvement of the urbanization level in China, the construction scale of urban drainage systems expands continuously, and the construction of a large number of drainage pipe networks exerts increasingly higher pressure to operation management staff. Due to historical development problems, actual drainage pipe networks still have the problems of aging, breakage and misconnection, leading to pollution to external environments and reducing the efficiency of the drainage systems, which in turn causes the problems of poor drainage and excessively low influent concentration of terminal sewage treatment facilities. The complexity and invisibility of underground drainage pipe networks make it more difficult to check and fix actual problems of pipe networks. Existing methods for checking pipe network problems mainly include: 1, a closed circuit television (CCTV) method, which perform visual check on pipe walls indirectly by means of a television imaging system capable of moving in pipes, but the upstream of drainage pipes needs to be blocked in advance, and the pipe walls need to be cleaned sometimes; 2, a quick view (QV) method, which realizes internal inspection of pipes at a manhole by means of a length-adjustable telescopic rod and a zoom lens, but pipes to be checked should not be too long, and the condition of underwater pipes or distant pipes cannot be checked; 3, a sonar method, which obtains geometrical information of sections and interfaces of pipes through a sonar scanning imaging system capable of moving in pipes, so as to find the problems such as deformation and deposition in pipes, but the water level in drainage pipes should be proper, and the work requirements for equipment operation and imaging analysis are high. These methods have the following defects:

These methods and devices involved in these methods have the disadvantages that inspectors determine the operating condition of pipes by directly and visually checking the condition of pipe walls, so the labor cost is high; pipe detection relies on the experience of the inspectors to a large extent, so the accuracy cannot be guaranteed, and the time cost is high; and the sonar method and the QV method require extra cables and working platforms, which are difficult to construct and inconvenient to carry, making the inspection cost high.

In view of this, a leakage quick-detection device for drainage pipes is proposed to solve the above problems.

BRIEF SUMMARY OF THE INVENTION

The objective of the invention is to provide a leakage quick-detection device for drainage pipes to solve the problems mentioned in the description of related art.

To fulfill the above objective, the invention provides the following technical solution: a leakage quick-detection device for drainage pipes comprises an operating rod assembly, a development module and a probe assembly, wherein the development module comprises a receiving shell, a development board is fixedly connected into the receiving shell, and a receiving and transmitting antenna is fixedly connected to the receiving shell and is electrically connected to the development board;

The probe assembly comprises a composite platform, four threaded through-holes are vertically and regularly formed in the composite platform, four threaded columns are threadedly connected into the four threaded through-holes respectively, a second camera, an ultrasonic transducer, a vane wheel flowmeter probe and a conductivity probe are fixedly connected to bottom surfaces of the four threaded columns respectively, a first camera is fixedly connected to a top end of the threaded column which is fixedly connected to the second camera, one ends of multiple wires are fixedly connected to the receiving shell, the other ends of the wires are fixedly connected to the composite platform, one ends of the wires are electrically connected to the development board, the other ends of the wires are electrically connected to the first camera, the second camera, the ultrasonic transducer, the vane wheel flowmeter probe and the conductivity probe.

Preferably, the operating rod assembly comprises a main rod and multiple extension rods, a first threaded hole is formed in a bottom end of the main rod, first studs are fixedly connected to top ends of the extension rods, second threaded holes are formed in bottom ends of the extension rods, the first stud on the extension rod at the top is threadedly connected to the first threaded hole, the first stud on each of the other extension rods is connected to the second threaded hole of the extension rod above, and a handle is fixedly connected to a top end of the main rod.

Preferably, two first clasps are clamped at the top end of the main rod, a mounting plate is fixedly connected to one side of each clasp, damping slots are vertically formed in the mounting plates, and two L-shaped insertion plates are fixedly connected to a side wall of the receiving shell and are inserted into the damping slots in an interference fit manner.

Preferably, a hinge assembly is fixedly connected to the center of a top surface of the composite platform and comprises an upper plate and a lower plate, two hinge seats are fixedly connected to a top surface of the lower plate, a hinge shaft is fixedly connected between top ends of the hinge seats, a hinge plate is fixedly connected to a bottom surface of the lower plate and is located between the two hinge seats, the hinge plate is rotatably connected to a hinge shaft, and the hinge shaft is sleeved with a damping sleeve.

Preferably, a second stud is fixedly connected to a top end of the upper plate, the second stud is threadedly connected to the second threaded hole of the extension rod at the bottom, and the lower plate is fixedly connected to the center of the top surface of the composite platform.

Preferably, a second waterproof and dustproof sleeve is fixedly connected to the upper plate and is located outside the second stud, the second waterproof and dustproof sleeve is disposed around the bottom end of the extension rod at the bottom, first waterproof and dustproof sleeves are disposed around the top ends of the extension rods, the first waterproof and dustproof sleeve on the extension rod at the top is disposed around the bottom end of the main rod, and the first waterproof and dustproof sleeve on each of the other extension rods is disposed around the bottom end of the extension rod above.

Preferably, multiple second clasps are clamped on the main rod and the extension rods a wire board is fixedly connected to one side of the second clasps, multiple wire ducts are formed in a side, away from the second clasps, of the wire board, outer sides of the wires are clamped in the wire ducts, a power supply terminal slot is formed in one side of the receiving shell and is electrically connected to the development board, a power supply switch is fixedly connected to one side of the receiving shell, and the receiving and transmitting antenna is electrically connected to the development board.

Preferably, two stop bolt holes are formed in two sides of the composite platform, the two stop bolt holes are fixedly connected to a U-shaped stop frame through two stop bolts, two stop through-holes are horizontally formed in two ends of the U-shaped stop frame respectively, and the stop bolts penetrate through the stop through-holes and are threadedly connected to the stop bolt holes.

Compared with the prior art, the invention has the following beneficial effects:

The change of water flow and water quality can be quickly reflected by ultrasonic data, conductivity data and flow data; compared with the traditional visual detection method, the detection dimensions are richer, the working time of personnel is shortened, more water flow information can be obtained, the labor intensity is reduced, and the troubleshooting accuracy is improved; in addition, the device is easy to assemble, and the length of the device can be changed, so the device is more convenient to carry; and compared with some traditional QV methods, extra cables and working platforms are not needed, so the pipe maintenance and detection cost is reduced.

In the figures: 1, operating rod assembly; 2, development module; 3, probe assembly; 4, hinge assembly; 5, wire; 11, main rod; 12, extension rod; 13, first threaded hole; 14, first stud; 15, second threaded hole; 16, first waterproof and dustproof sleeve; 17, first clasp; 18, mounting plate; 19, damping slot; 110, second clasp; 111, wire board; 112, wire duct; 113, handle; 21, receiving shell; 22, development board; 23, receiving and transmitting antenna; 24, power supply terminal slot; 25, power supply switch; 26, L-shaped insertion plate; 31, composite platform; 32, threaded through-hole; 33, threaded column; 34, first camera; 35, second camera; 36, ultrasonic transducer; 37, vane wheel flowmeter probe; 38, conductivity probe; 39, U-shaped stop frame; 310, stop bolt hole; 311, stop through-hole; 312, stop bolt; 41, upper plate; 42, lower plate; 43, hinge seat; 44, hinge shaft; 45, damping sleeve; 46, hinge plate; 47, second stud; 48, second waterproof and dustproof sleeve.

DETAILED DESCRIPTION OF THE INVENTION

The technical solutions of the embodiments of the invention will be clearly and completely described below in conjunction with the accompanying drawings of the embodiments of the invention. Obviously, the following embodiments are merely illustrative ones, and are not all possible ones of the invention. All other embodiments obtained by those ordinarily skilled in the art based on the following ones without creative labor should also fall within the protection scope of the invention.

Embodiment 1

Figure 1:
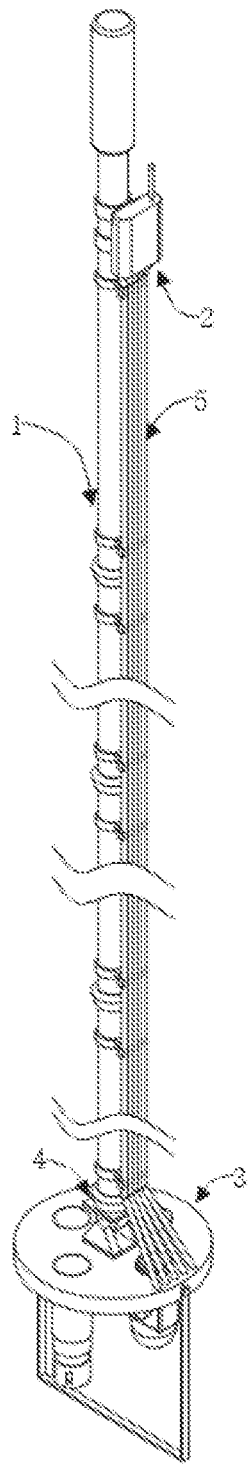
FIG. 1 is a structural view of a main part in Embodiment 1 of the invention.
Figure 2:
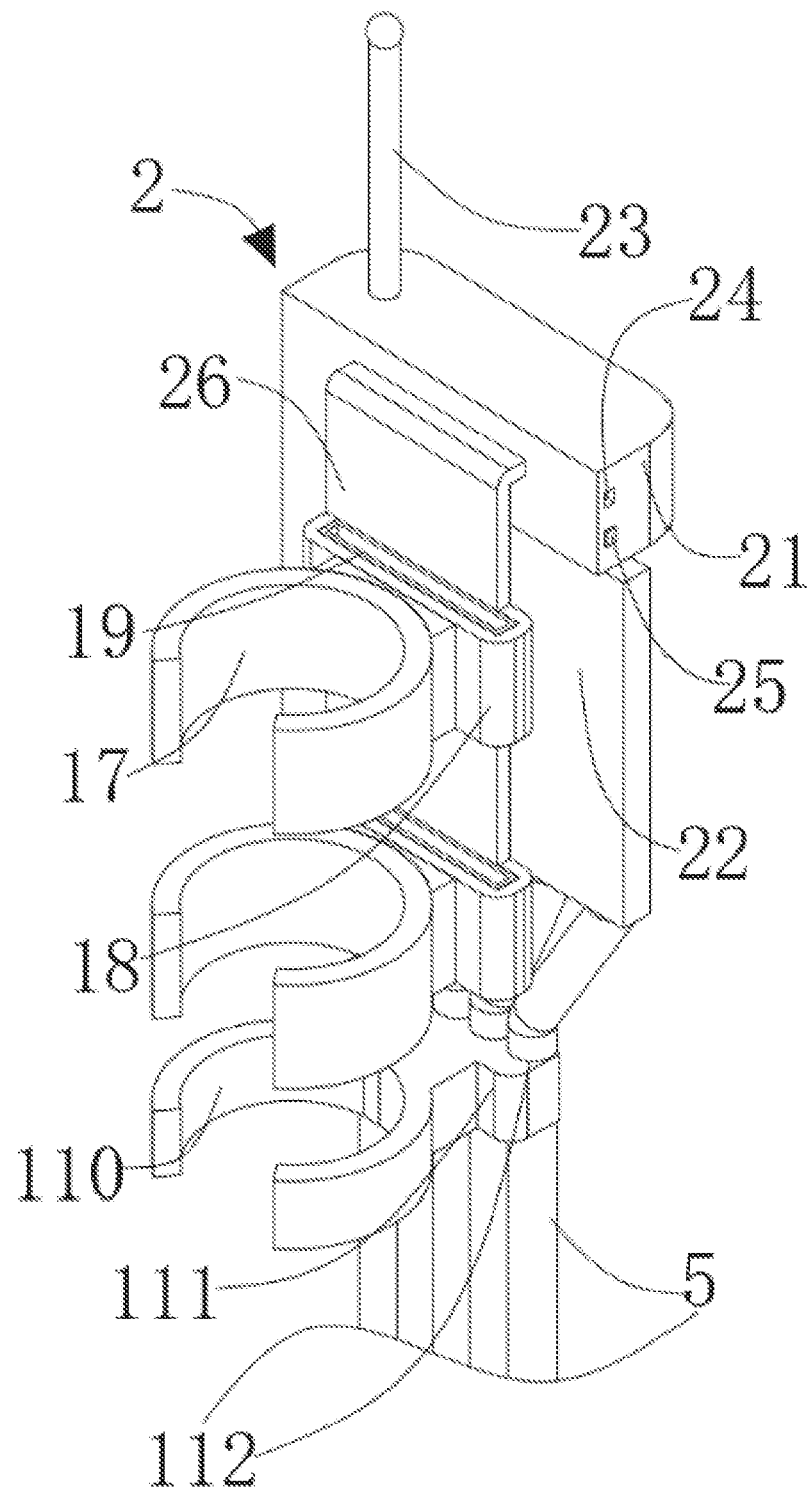
FIG. 2 is a structural view of a development module in Embodiment 1 and Embodiment 2 of the invention.
Figure 3:
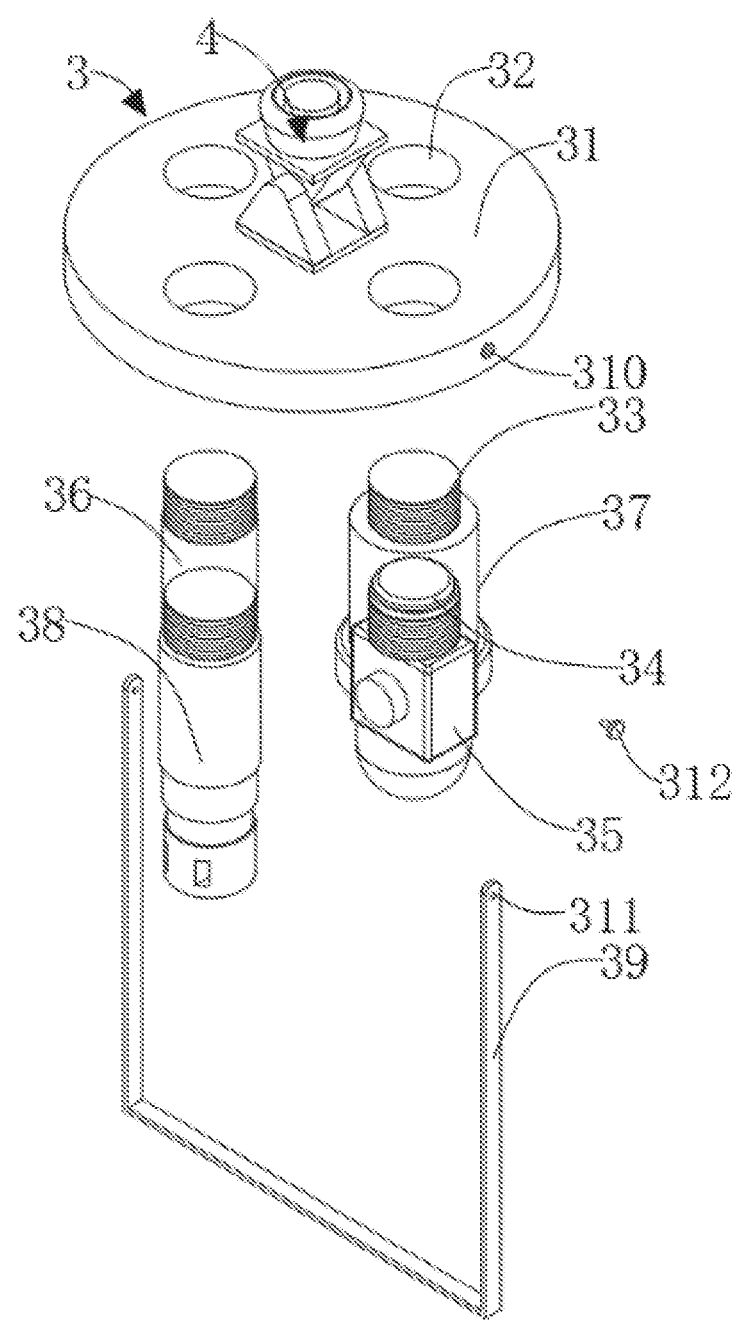
FIG. 3 is an exploded structural view of a probe assembly in Embodiment 1 and Embodiment 2 of the invention.
Figure 4:
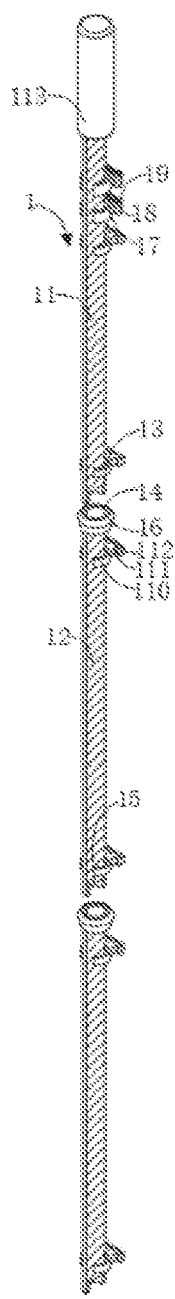
FIG. 4 is an exploded sectional structural view of an operating rod assembly in Embodiment 2 of the invention.
Figure 5:
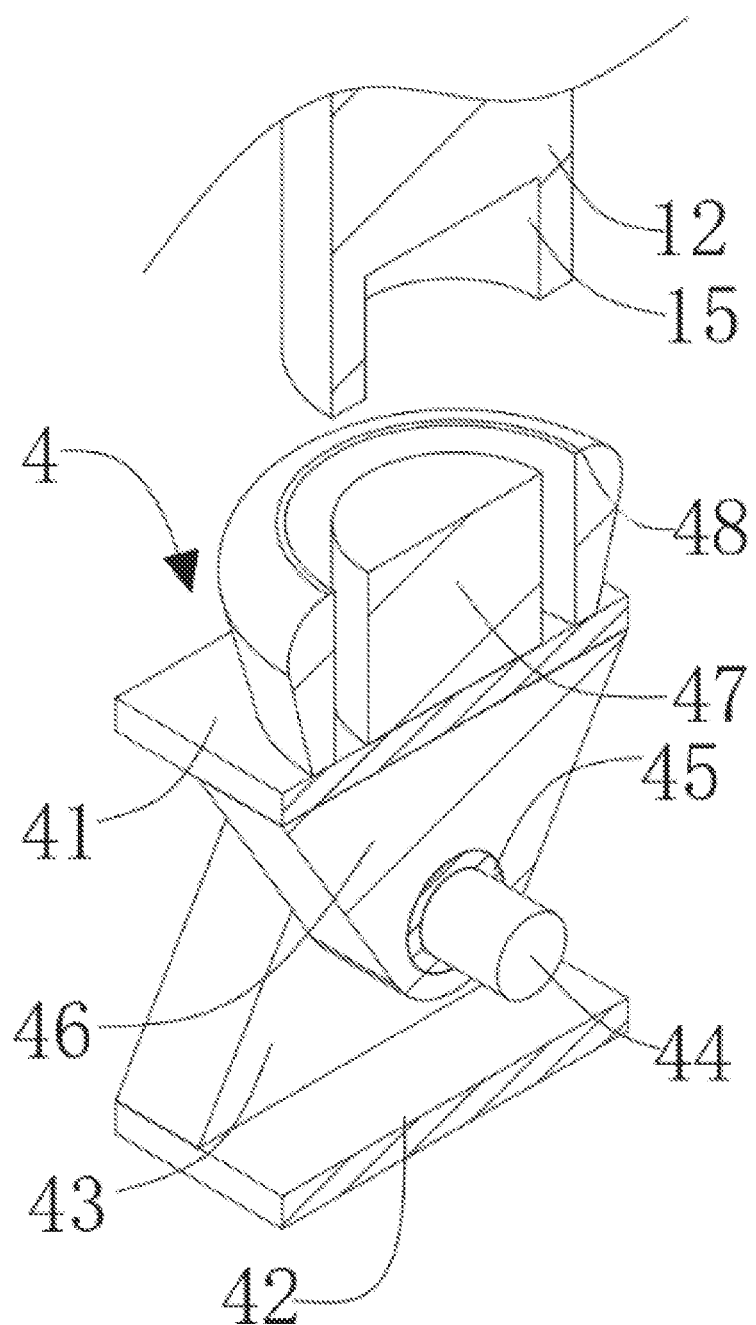
FIG. 5 is a sectional structural view of a hinge assembly in Embodiment 2 of the invention.

Referring to FIG. 1-FIG. 3, the invention provides the following technical solution: a leakage quick-detection device for drainage pipes comprises an operating rod assembly 1, a development module 2 and a probe assembly 3, wherein the development module 2 comprises a receiving shell 21, a development board 22 is fixedly connected into the receiving shell 21, a receiving and transmitting antenna 23 is fixedly connected to the receiving shell 21, and the receiving and transmitting antenna 23 is electrically connected to the development board 22;

The probe assembly 3 comprises an composite platform 31, four threaded through-holes 32 are vertically and regularly formed in the composite platform 31, four threaded columns 33 are threadedly connected into the four threaded through-holes 32 respectively, a second camera 35, an ultrasonic transducer 36, a vane wheel flowmeter probe 37 and a conductivity probe 38 are fixedly connected to bottom surfaces of the four threaded columns 33 respectively, a first camera 34 is fixedly connected to a top end of the threaded column 33 which is fixedly connected to the second camera 35, one ends of multiple wires 5 are fixedly connected to the receiving shell 21, the other ends of the wires 5 are fixedly connected to the composite platform 31, one ends of the wires 5 are electrically connected to the development board 22, and the other ends of the wires 5 are electrically connected to the first camera 34, the second camera 35, the ultrasonic transducer 36, the vane wheel flowmeter probe 37 and the conductivity probe 38; the vane wheel flowmeter probe 37 detects water flow data, the conductivity probe 38 detects conductivity data, the ultrasonic transducer 36 exchanges received or transmitted acoustical signals at a certain frequency, down-flow or counter-flow propagation of the acoustic signals will produce signal changes due to the Doppler effect, back transmission of ultrasonic waves can reflect part of the basic condition in a pipe, all data is transmitted to the development board 22, and various water flow information can be obtained rapidly and accurately by analyzing acoustic and electric signals; in case of severe water seepage or leakage, the transmission of the ultrasonic waves will be disturbed physically; and if the down-flow propagation of the acoustic signals is hindered, it indicates that the sewage flow condition is unsatisfying, at this moment, detected conductivity data is compared with normal data, and if the detected conductivity data is largely different from the normal data, it can be quickly determined that the pipe leaks.

Embodiment 2

Refer to FIG. 2-FIG. 5 which illustrate Embodiment 2 of the invention. Based on Embodiment 1, in this embodiment, the operating rod assembly 1 comprises a main rod 11 and multiple extension rods 12, a first threaded hole 13 is formed in a bottom end of the main rod 11, first studs 14 are fixedly connected to top ends of the extension rods 12, second threaded holes 15 are formed in bottom ends of the extension rods 12, the first stud 14 on the extension rod 12 at the top is threadedly connected to the first threaded hole 13, the first stud 14 on each of the other extension rods 12 is threadedly connected to the second threaded hole 15 of the extension rod 12 above, a handle 113 is fixedly connected to a top end of the main rod 11 and is connected to the multiple extension rods 12 through the main rod 11, and the number of the extension rods 12 can be increased or decreased according to the depth of a manhole. The operating rod assembly is easy to assemble and is suitable for manholes with different depths.

Two first clasps 17 are clamped at the top end of the main rod 11, a mounting plate 18 is fixedly connected to one side of each first clasp 17, damping slots 19 are vertically formed in the mounting plates 18, and two L-shaped insertion plates 26 are fixedly connected to a side wall of the receiving shell 21 and are inserted into the damping slots 19 in an interference fit manner, such that the development module 2 can be inserted into and pulled out of the main rod 11 easily, and using is convenient.

A hinge assembly 4 is fixedly connected to the center of a top surface of the composite platform 31 and comprises an upper plate 41 and a lower plate 42, two hinge seats 43 are fixedly connected to a top surface of the lower plate 42, a hinge shaft 44 is fixedly connected between top ends of the hinge seats 43, a hinge plate 46 is fixedly connected to a bottom surface of the lower plate 42 and is located between the two hinge seats 43, the hinge plate 46 is rotatably connected to the hinge shaft 44, and the hinge shaft 44 is sleeved with a damping sleeve 45.

A second stud 47 is fixedly connected to a top surface of the upper plate 41 and is threadedly connected to the second threaded hole 15 of the extension rod 12 at the bottom, and the lower plate 42 is fixedly connected to the center of the top surface of the composite platform 31.

A second waterproof and rustproof sleeve 48 is fixedly connected to the upper plate 41 and is located outside the second stud 47, the second waterproof and dustproof sleeve 48 is disposed around the bottom end of the extension rod 12 at the bottom, the top ends of the extension rods 12 are fixedly sleeved with first waterproof and dustproof sleeves 16, the first waterproof and dustproof sleeve 16 on the extension rod 12 at the top is disposed around the bottom end of the main rod 11, and the first waterproof and dustproof sleeve 16 on each of the other extension rods 12 is disposed around the bottom end of the extension rod 12 above.

Multiple second clasps 110 are clamped on the main rod 11 and the multiple extension rods 12, a wire board 111 is fixedly connected to one side of the second clasps 110, multiple wire ducts 112 are formed in a side, away from the second clasps 110, of the wire board 111, outer sides of the wires 5 are clamped in the wire ducts 112, a power supply terminal slot 24 is formed in one side of the receiving shell 21 and is electrically connected to the development board 22, a power supply switch 25 is fixedly connected to one side of the receiving shell 21, and the receiving and transmitting antenna 23 is electrically connected to the development board 22.

Two stop bolt holes 310 are formed in two sides of the composite platform 31 respectively and are fixedly connected to a U-shaped stop frame 39 through two stop bolts 312, two stop through-holes 311 are horizontally formed in two ends of the U-shaped stop frame 39 respectively, and the stop bolts 312 penetrate through the stop through-holes 311 and are threadedly connected to the stop bolt holes 310; and during use, the U-shaped stop frame 39 is rotated below the composite platform 31 and is then fixed by tightening the stop bolts 312, such that the situation where the probe is damaged due to direct contact with the bottom surface of a pipe is avoided.

Embodiment 3

Referring to FIG. 1-FIG. 5, in Embodiment 3 which is based on the above two embodiments, two devices are used together; the device is assembled at first, different numbers of extension rods 12 are used according to the depth of a manhole, then the main rod 11 and the multiple extension rods 12 are connected, and the development module 2 and the probe assembly 3 are mounted on the operating rod assembly 1; next, a power supply is connected to the power supply terminal slot 24, the power supply switch 25 is turned on, and the U-shaped stop frame 39 is rotated below the composite platform 31 and is then fixed by tightening the stop bolts 312; then, the two probe assemblies 3 are disposed below the liquid level in a pipe detected via the manhole, the U-shaped stop frames 39 are made to abut against a lower portion of the pipe to ensure that the probes are located on the midline of the pipe and the heights and positions of the two devices with respect to the pipe are identical; the probes are started through a background system by means of the receiving and transmitting antennas 23 to collect data such as conductivity and flow rate; the two ultrasonic transducers 36 exchange received or transmitted acoustic signals at a certain frequency, down-flow or counter-flow propagation of the acoustic signals will produce signal changes due to the Doppler effect, back transmission of ultrasonic waves can reflect part of the basic condition in the pipe, and various water flow information can be obtained rapidly and accurately by analyzing acoustic and electric signals through the background system; in case of severe water seepage or leakage, the transmission of the ultrasonic waves will be disturbed physically; and if the down-flow propagation of the acoustic signals is hindered, it indicates that the sewage flow condition is unsatisfying, at this moment, detected conductivity data is compared with normal data, and if the detected conductivity data is largely different from the normal data, it can be quickly determined that the pipe leaks. The invention is based on the following principle: fluid in a drainage pipe under normal condition is approximately a stable laminar flow in a circular pipe; when fluid seeps into the drainage pipe due to breakage or misconnection, the flow in the drainage pipe will turn into a turbulent flow, which is significantly different from the laminar flow in ultrasonic features such as bandwidth and form, so the flow state of water in the pipe can be determined. In addition, the conductivity reflects the concentration of an electrolyte such as solute salt in liquid and can reflect to some extent the purity of water. Due to the fact that the seeping liquid in the pipe is often underground water and rainwater often enters the pipe if the pipe is connected mistakenly, the conductivity of seeping liquid is greatly different from that of sewage in the sewage pipe, the change of conductivity from the starting point to the end point of the pipe can help users determine whether leaking occurs, the mean flow rate of fluid in the pipe can be roughly measured by flowmeters at two ends of the pipe, then the time for the fluid to flow from one end of the pipe to the other end of the pipe is estimated, and the condition of the drainage pipe can be further determined according to the change of the conductivity and a time sequence synchronized in advance. In the invention, the change of water flow and water quality can be quickly reflected by ultrasonic data, conductivity data and flow data, and compared with the traditional visual detection method, the detection dimensions are richer, the working time of personnel is shortened, more water flow information can be obtained, the labor intensity is reduced, and the troubleshooting accuracy is improved; in addition, the device is easy to assemble, and the length of the device can be changed, so the device is more convenient to carry; and compared with some traditional QV methods, extra cables and working platforms are not needed, so the pipe maintenance and detection cost is reduced.

Although the embodiments of the invention have been illustrated and described above, those ordinarily skilled in the art should understand that various changes, amendments, substitutions and transformations can be made without departing from the principle and spirit of the invention. The scope of the invention should be defined by the claims and their equivalents.

What is claimed is:

1. A leakage quick-detection device for drainage pipes, comprising an operating rod assembly, a development module and a probe assembly, wherein:
    the development module comprises a receiving shell, a development board is fixedly connected into the receiving shell, and a receiving and transmitting antenna is fixedly connected to the receiving shell and is electrically connected to the development board;
    the probe assembly comprises a composite platform, four threaded through-holes are vertically and regularly formed in the composite platform, four threaded columns are threadedly connected into the four threaded through-holes respectively, a second camera, an ultrasonic transducer, a vane wheel flowmeter probe and a conductivity probe are fixedly connected to bottom surfaces of the four threaded columns respectively, a first camera is fixedly connected to a top end of the threaded column which is fixedly connected to the second camera, one ends of multiple wires are fixedly connected to the receiving shell, the other ends of the wires are fixedly connected to the composite platform, one ends of the wires are electrically connected to the development board, the other ends of the wires are electrically connected to the first camera, the second camera, the ultrasonic transducer, the vane wheel flowmeter probe and the conductivity probe.

2. The leakage quick-detection device for drainage pipes according to claim 1, wherein the operating rod assembly comprises a main rod and multiple extension rods, a first threaded hole is formed in a bottom end of the main rod, first studs are fixedly connected to top ends of the extension rods, second threaded holes are formed in bottom ends of the extension rods, the first stud on the extension rod at the top is threadedly connected to the first threaded hole, the first stud on each of the other extension rods is connected to the second threaded hole of the extension rod above, and a handle is fixedly connected to a top end of the main rod.

3. The leakage quick-detection device for drainage pipes according to claim 2, wherein two first clasps are clamped at the top end of the main rod, a mounting plate is fixedly connected to one side of each said clasp, damping slots are vertically formed in the mounting plates, and two L-shaped insertion plates are fixedly connected to a side wall of the receiving shell and are inserted into the damping slots in an interference fit manner.

4. The leakage quick-detection device for drainage pipes according to claim 2, wherein a hinge assembly is fixedly connected to a center of a top surface of the composite platform and comprises an upper plate and a lower plate, two hinge seats are fixedly connected to a top surface of the lower plate, a hinge shaft is fixedly connected between top ends of the hinge seats, a hinge plate is fixedly connected to a bottom surface of the lower plate and is located between the two hinge seats, the hinge plate is rotatably connected to a hinge shaft, and the hinge shaft is sleeved with a damping sleeve.

5. The leakage quick-detection device for drainage pipes according to claim 4, wherein a second stud is fixedly connected to a top end of the upper plate, the second stud is threadedly connected to the second threaded hole of the extension rod at the bottom, and the lower plate is fixedly connected to the center of the top surface of the composite platform.

6. The leakage quick-detection device for drainage pipes according to claim 5, wherein a second waterproof and dustproof sleeve is fixedly connected to the upper plate and is located outside the second stud, the second waterproof and dustproof sleeve is disposed around the bottom end of the extension rod at the bottom, first waterproof and dustproof sleeves are disposed around the top ends of the extension rods, the first waterproof and dustproof sleeve on the extension rod at the top is disposed around the bottom end of the main rod, and the first waterproof and dustproof sleeve on each of the other extension rods is disposed around the bottom end of the extension rod above.

7. The leakage quick-detection device for drainage pipes according to claim 2, wherein multiple second clasps are clamped on the main rod and the extension rods, a wire board is fixedly connected to one side of the second clasps, multiple wire ducts are formed in a side, away from the second clasps, of the wire board, outer sides of the wires are clamped in the wire ducts, a power supply terminal slot is formed in one side of the receiving shell and is electrically connected to the development board, a power supply switch is fixedly connected to one side of the receiving shell, and the receiving and transmitting antenna is electrically connected to the development board.

8. The leakage quick-detection device for drainage pipes according to claim 1, wherein two stop bolt holes are formed in two sides of the composite platform, the two stop bolt holes are fixedly connected to a U-shaped stop frame through two stop bolts, two stop through-holes are horizontally formed in two ends of the U-shaped stop frame respectively, and the stop bolts penetrate through the stop through-holes and are threadedly connected to the stop bolt holes.

* * * * *